(12) United States Patent
Abuelsaad et al.

(10) Patent No.: US 9,928,623 B2
(45) Date of Patent: Mar. 27, 2018

(54) SOCIALLY GENERATED AND SHARED GRAPHICAL REPRESENTATIONS

(71) Applicant: International Business Machines Corporation, Armonk, NY (US)

(72) Inventors: Kelly Abuelsaad, Somers, NY (US); Soobaek Jang, Hamden, CT (US); Daniel C. Krook, Fairfield, CT (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 14/484,730

(22) Filed: Sep. 12, 2014

(65) Prior Publication Data
US 2016/0078652 A1 Mar. 17, 2016

(51) Int. Cl.
*G06T 11/20* (2006.01)
*G06F 3/0481* (2013.01)
*G06N 99/00* (2010.01)

(52) U.S. Cl.
CPC .......... *G06T 11/206* (2013.01); *G06F 3/0481* (2013.01); *G06N 99/005* (2013.01)

(58) Field of Classification Search
CPC .................................................... G06N 99/005
USPC ................................................. 707/723, 749
See application file for complete search history.

(56) References Cited

U.S. PATENT DOCUMENTS

| | | | | |
|---|---|---|---|---|
| 7,013,238 B1* | 3/2006 | Weare | ..................... | G06Q 30/02 702/182 |
| 7,080,071 B2* | 7/2006 | Henrion | ................. | G06Q 30/02 707/706 |
| 7,295,995 B1* | 11/2007 | York | ..................... | G06Q 30/02 705/26.8 |
| 7,890,363 B2* | 2/2011 | Gross | ..................... | G06Q 30/02 705/7.31 |
| 8,024,213 B1* | 9/2011 | Fano | .................. | G06Q 30/0201 705/1.1 |

(Continued)

FOREIGN PATENT DOCUMENTS

| | | |
|---|---|---|
| WO | 2007062885 A1 | 6/2007 |
| WO | 2009154483 A1 | 12/2009 |
| WO | 2013132309 A1 | 9/2013 |

OTHER PUBLICATIONS

Heer et al., "Crowdsourcing Graphical Perception: Using Mechanical Turk to Assess Visualization Design", CHI 2010: Visualization, Apr. 10-15, 2010, Atlanta, GA, USA, pp. 203-212.

(Continued)

*Primary Examiner* — Mohammed H Zuberi
(74) *Attorney, Agent, or Firm* — Mochai Chuaychoo

(57) ABSTRACT

According to embodiments of the present invention, one or more computer processors display unstructured data. One or more computer processors display a first chart that graphically represents at least a portion of the unstructured data. In response to the first chart failing to satisfy a user-defined criteria, one or more computer processors modifies the first chart to generate a second chart that graphically represents at least a portion of the unstructured data in a user-defined manner. In certain embodiments, the unstructured data includes information that does not have a pre-defined data model and/or is not organized in a pre-defined manner.

18 Claims, 5 Drawing Sheets

(56) References Cited

U.S. PATENT DOCUMENTS

| | | | | |
|---|---|---|---|---|
| 8,577,753 B1* | 11/2013 | Vincent | G06Q 30/02 | 705/26.1 |
| 8,949,250 B1* | 2/2015 | Garg | G06F 17/3053 | 707/748 |
| 9,135,665 B2* | 9/2015 | England | G06Q 30/0282 | |
| 9,245,243 B2 | 1/2016 | Mohan | | |
| 9,424,318 B2 | 8/2016 | Anand et al. | | |
| 2002/0152163 A1* | 10/2002 | Bezos | G06Q 20/00 | 705/40 |
| 2004/0167907 A1* | 8/2004 | Wakefield | G06F 17/30569 | |
| 2005/0203807 A1* | 9/2005 | Bezos | G06F 17/30867 | 705/14.53 |
| 2005/0210285 A1* | 9/2005 | Williams | G06F 17/30867 | 726/5 |
| 2006/0156326 A1* | 7/2006 | Goronzy | G06F 17/30035 | 725/13 |
| 2007/0050192 A1* | 3/2007 | Gutta | G06Q 10/10 | 725/39 |
| 2008/0208714 A1* | 8/2008 | Sundaresan | G06Q 10/10 | 705/26.3 |
| 2009/0240555 A1* | 9/2009 | Panje | G06Q 30/02 | 705/7.29 |
| 2012/0036467 A1* | 2/2012 | Tom | G06Q 10/047 | 715/772 |
| 2012/0095675 A1* | 4/2012 | Tom | G01C 21/343 | 701/425 |
| 2012/0178431 A1* | 7/2012 | Gold | H04M 1/7253 | 455/420 |
| 2012/0272205 A1* | 10/2012 | Fox | G06F 8/36 | 717/101 |
| 2012/0278825 A1* | 11/2012 | Tran | G06Q 30/0241 | 725/13 |
| 2012/0284247 A1* | 11/2012 | Jiang | G06F 17/30867 | 707/706 |
| 2012/0284256 A1* | 11/2012 | Mahajan | G06F 17/3087 | 707/722 |
| 2012/0323898 A1* | 12/2012 | Kumar | G06F 17/30867 | 707/723 |
| 2012/0324589 A1* | 12/2012 | Nukala | H04L 67/1097 | 726/28 |
| 2013/0090961 A1* | 4/2013 | Smith | G06Q 40/00 | 705/7.11 |
| 2013/0103677 A1* | 4/2013 | Chakra | G06F 17/30994 | 707/723 |
| 2013/0132308 A1* | 5/2013 | Boss | G06F 17/30976 | 706/12 |
| 2013/0151519 A1* | 6/2013 | Akhin | G06F 17/30867 | 707/737 |
| 2013/0155876 A1* | 6/2013 | Potra | H04W 36/14 | 370/248 |
| 2013/0195422 A1* | 8/2013 | Patil | H04N 21/23424 | 386/239 |
| 2013/0215125 A1* | 8/2013 | Mahajan | H04M 1/72569 | 345/522 |
| 2014/0201276 A1* | 7/2014 | Lymberopoulos | G06Q 10/103 | 709/204 |
| 2014/0207479 A1* | 7/2014 | Noland | G06F 19/327 | 705/2 |
| 2014/0279288 A1* | 9/2014 | Wouk | G06Q 30/0643 | 705/27.2 |
| 2015/0033084 A1* | 1/2015 | Sasturkar | G06F 11/0709 | 714/46 |
| 2015/0055608 A1* | 2/2015 | Egner | H04W 4/028 | 370/329 |
| 2015/0056960 A1* | 2/2015 | Egner | H04W 12/08 | 455/411 |
| 2015/0065214 A1* | 3/2015 | Olson | A63F 13/65 | 463/9 |
| 2015/0170035 A1* | 6/2015 | Singh | G06N 5/022 | 706/46 |
| 2015/0178651 A1* | 6/2015 | Eickelmann | G06Q 10/06315 | 705/7.25 |
| 2015/0200871 A1* | 7/2015 | Cheung | G06F 17/3087 | 707/723 |
| 2015/0227632 A1* | 8/2015 | Lunardi | G06F 17/30702 | 707/722 |
| 2015/0347901 A1* | 12/2015 | Cama | G06N 5/022 | 707/728 |
| 2016/0029155 A1* | 1/2016 | Kerr | H04W 4/02 | 455/456.3 |
| 2016/0048571 A1* | 2/2016 | Davidson | G06F 17/30589 | 707/741 |
| 2016/0054865 A1* | 2/2016 | Kerr | H04L 67/02 | 715/739 |
| 2016/0342604 A1 | 11/2016 | Link et al. | | |

OTHER PUBLICATIONS

High, Rob, "The Era of Cognitive Systems: An Inside Look at IBM Watson and How it Works", IBM Watson, Redbooks, document, REDP-4955-00, was created or updated on Dec. 12, 2012, pp. 1-14.

K.N.C., "Crowdsourcing data visualisations, On your mark, get set . . . ", Aug. 21, 2012, The Economist.

Sokol, et al., "Context-Based Analytics in a Big Data World: Better Decisions", An IBM Redbooks Point of View publication, Document, REDP-4962-00, was created or updated on Aug. 20, 2013, pp. 1-8.

* cited by examiner

SOCIALLY GENERATED AND SHARED GRAPHICAL REPRESENTATIONS

BACKGROUND

The present disclosure relates generally to the field of data processing, and more particularly to sharing crowd sourced graphical representations.

Structured information may be defined as information whose intended meaning is explicitly represented in the structure or format of the data. Unstructured information may be characterized as information whose meaning requires interpretation in order to approximate and extract the intended meaning. Examples include natural language documents, speech, audio, images, and video. In other words, unstructured data is any data residing unorganized outside a database.

Unstructured data can include text, audio, video, and/or graphics. Unstructured information is believed to represent one of the largest and fastest growing sources of information available. In some estimation, unstructured data represents 80% of all corporate information. High-value information in this huge amount of data may be difficult to discover. Unstructured information may not be in a format adapted to search techniques. Searching for information in unstructured sources may not always be practical. First, data must be analyzed to detect and locate items of interest. The results must then be structured to facilitate searchability. Charts are graphical representations of data, in which data is represented by symbols, such as bars in a bar chart, lines in a line chart, or slices in a pie chart.

It is known to have internet-based competitions, such as contests with rewards for contest winners, to determine which person has made the best data visualization (for example, chart, graph, etc.) to represent a given set of unstructured data. These competitions are generally judged by a relatively small group of human "experts" (as opposed to a large group of people without special qualifications). These competitions do not allow the competitors to see each other's entries during the time that the competition is open to new entries. It is believed that the reason for this access restriction is so that the people designing new data visualizations will not build on each others work (by learning from each other's mistakes, etc.).

SUMMARY

According to embodiments of the present invention, one or more computer processors display unstructured data. One or more computer processors receive a first plurality of data visualization data sets, including a first data visualization data set. Each data visualization data set is machine readable data for generating a display of a data visualization. Each data visualization, respectively corresponding to a data visualization data set of the first plurality of data visualization data sets, represents at least a portion of data in a first unstructured data set. The one or more processors receive a first plurality of user evaluations that evaluate the data visualizations corresponding to the first plurality of data visualization data sets. The one or processors generate a first ranking based, at least in part on the first plurality of user evaluations.

DETAILED DESCRIPTION

Figure 1:
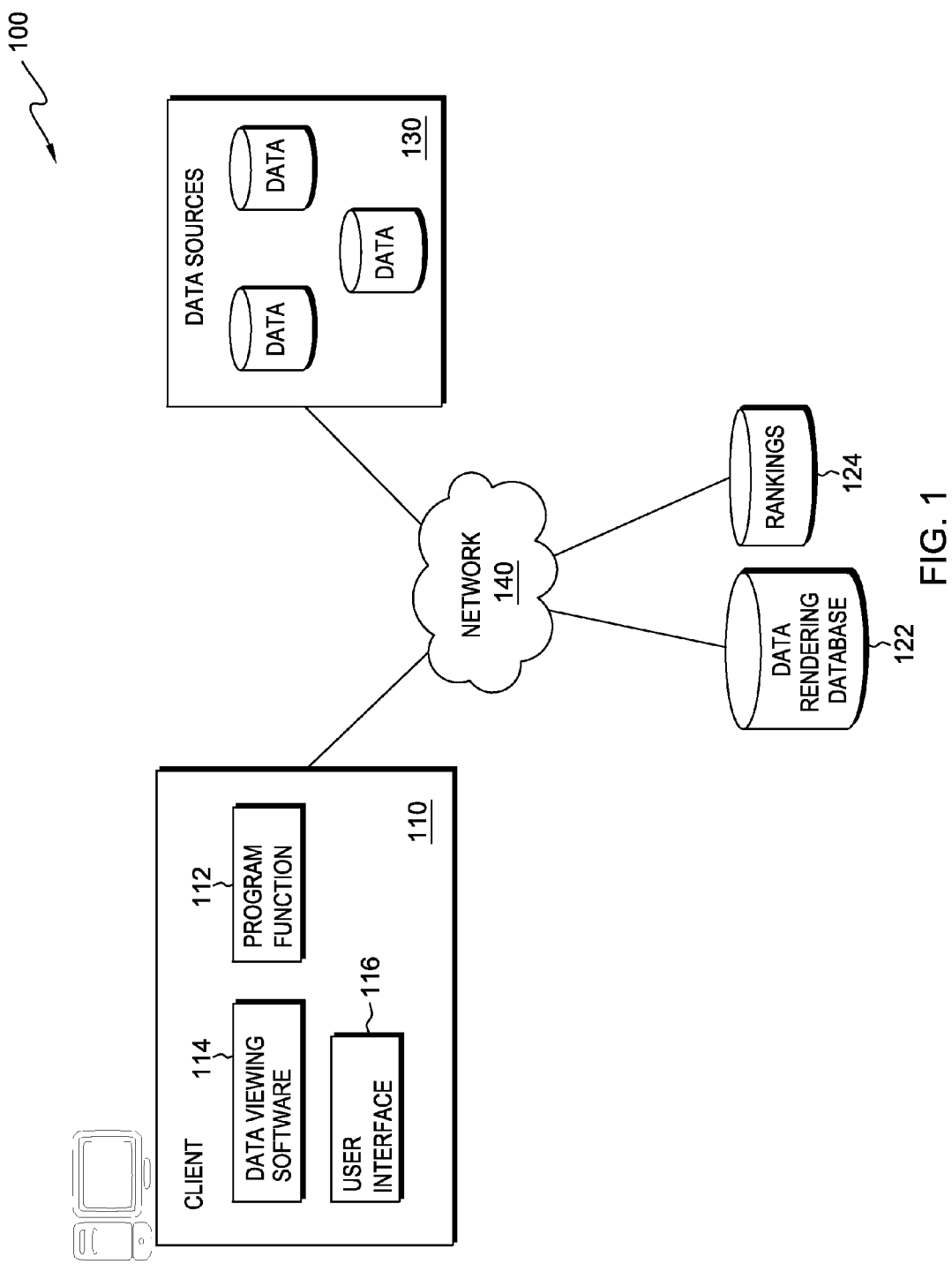
FIG. 1 is a block diagram illustrating an environment, in accordance with an embodiment of the present invention.

With reference now to FIGS. 1 to 5, the descriptions of various embodiments of the present invention are presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java™ Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiments of the present invention are used to produce and/or present "data visualizations." As used herein, "data visualizations" includes charts, graphs, diagrams, flow charts, three dimensional representation, color coded representation, tables and the like. As used herein, "data visualizations" do not include prose text, poetry type text, photographs, graphics, company logos, visualizations generated by musical metadata, annotations in pre-existing texts, etc.

Some embodiments of the present invention facilitate sharing of "crowdsourced" data visualizations (sometimes herein more simply referred to as "charts"). In some embodiments, charts for unstructured data are generated by users and made available for viewing and/or review by subsequent users. In other embodiments, users rank pre-generated charts, which are made available to subsequent users. Certain embodiments allow one or more users to review and rank (crowdsourcing) user-generated charts, which reduce the need for subsequent users to generate charts. Crowdsourced charts that effectively depict unstructured data can increase a user's comprehension thereof. Embodiments of the present invention will now be described in detail with reference to the Figures. FIG. 1 is a block diagram illustrating an environment, generally designated 100, in accordance with one embodiment of the present invention.

Environment 100 includes client 110, data rendering database 122, rankings 124, and data sources 130, all interconnected over network 140. Network 140 can be, for example, a local area network (LAN), a wide area network (WAN) such as the Internet, or a combination of the two, and can include wired, wireless, or fiber optic connections. Network 140 may be a distributed computing environment utilizing clustered computers and components that act as a single pool of seamless resources, as is common in data centers and with cloud computing applications or "clouds". In general, network 140 can be any combination of connections and protocols that will support communications between client 110 and additional computing devices.

In various embodiments of the present invention, client 110 may be a laptop computer, a tablet computer, a netbook computer, a personal computer (PC), a desktop computer, a personal digital assistant (PDA), a smart phone, or any programmable electronic device capable of communicating with an additional computing devices and resources via network 140. Data sources 130 are information repositories that include unstructured data, such as information included in one or more webpages, email correspondences, word processing documents, video, and text documents. In an embodiment, data sources 130 represent information repositories that are available via the Internet. Data rendering database 122 is an information repository that includes user generated charts. Rankings 124 is an information repository that includes user generated rankings associated with the user generated charts included in data rendering database 122. In certain embodiments, information included in rankings 124 comprises rankings that reflect how effective unstructured data is graphically represented by a particular chart that is included in data rendering database 122. In other embodiments, information included in rankings 124 includes user-generated comments that are associated with the charts of data rendering database 122.

Client 110 includes user interface 116, data viewing software 114, and program function 112, in accordance with an embodiment of the present invention. Client 110 is a device utilized by users to access information that includes unstructured data and/or charts thereof. User interface 116 can be a gesture-based, text-based, and/or graphics-based user interface. User interface 116 can also be a motion tracking user interface or a combination of any of the previously mentioned user interface types. In an embodiment, user interface 116 is a touch screen display. User interface 116 can facilitate the generation of charts of unstructured data, such as the data included in data sources 130. Data viewing software 114 is software used for accessing and viewing data that includes unstructured data, in accordance with an embodiment of the present invention. In an embodiment, data viewing software 114 is a web browser, email client, text document viewer, and/or word processor.

Data viewing software 114 is in communication with program function 112. Program function 112 is software that allows a user to generate charts for unstructured data, in accordance with an embodiment of the present invention. Program function 112 stores user-generated charts in data rendering database 122. Program function 112 stores user-generated rankings that are associated with the user-generated charts of data rendering database 122 in rankings 124. Program function 112 allows users to rank the user-generated charts that are included in data rendering database 122. Program function 112 allows users to modify the user-generated charts that are included in data rendering database 122. Program function 112 can generate charts, which include but are not limited to histograms, tables, bar charts, line charts, diagrams, maps, plots, and sparklines, that seek to effectively illustrate unstructured data. Program function 112 allows users to author charts.

To further explain, storage of user-generated charts into a database requires a structured query language (SQL) statement that will insert the chart into the database. In the embodiment under discussion, program function 112 generates the SQL statement and inserts it into the database. User-generated rankings are associated with the chart using a relational database model. In this embodiment, the relational database is stored in the storage system shown in FIG. 1. In this embodiment, in the table(s) of the relational database, a column called "chart_id" uniquely identifies a chart. Another column, called "ranking" has a numerical value associated to that chart identifier. The charts are stored in (or, at least linked from) the same relational database table as the rankings. In this embodiment, the operation of modifying the charts is similar to creating them. The implementation under discussion involves retrieving the chart from the database.

Figure 2:
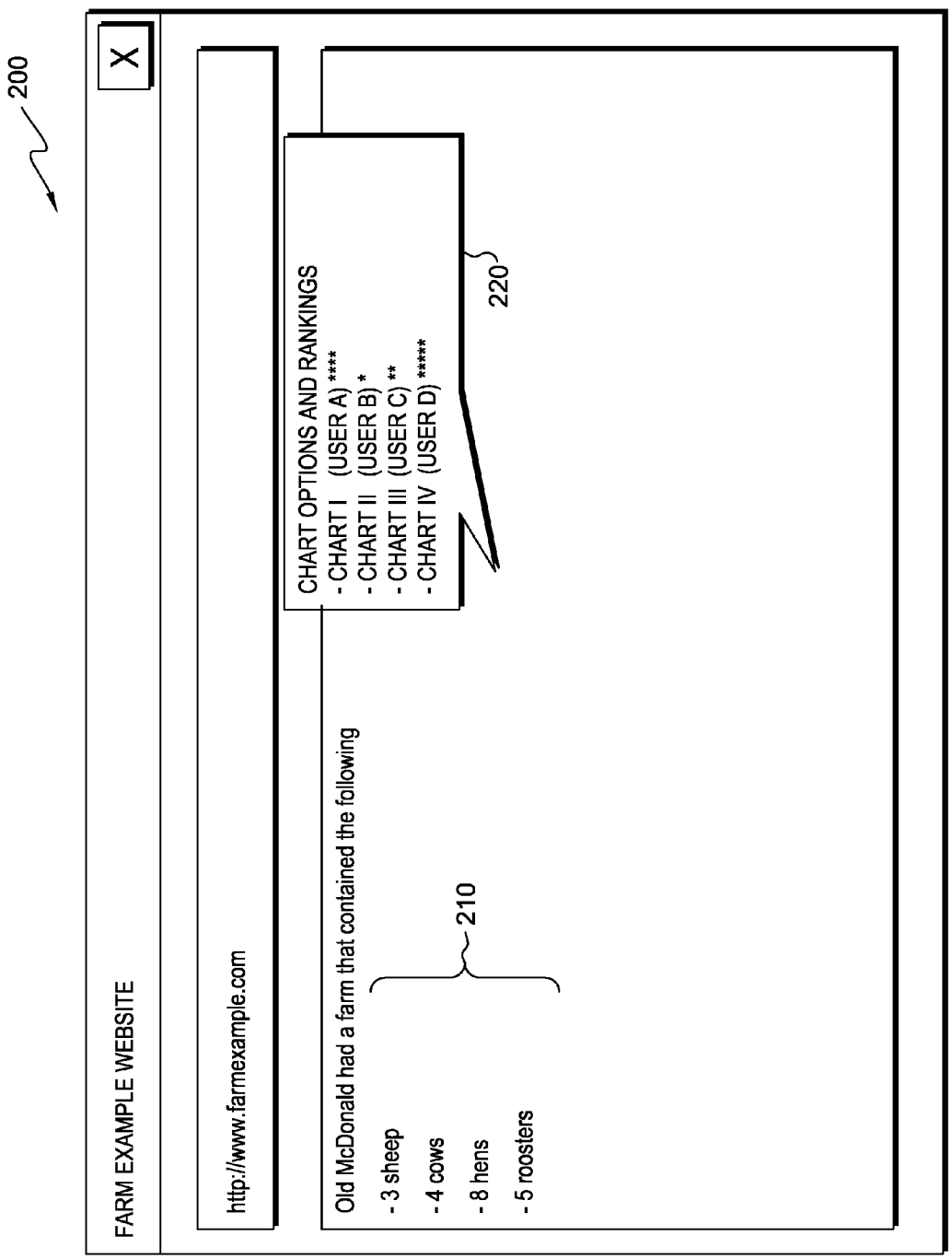
FIG. 2 is a depiction of an exemplary Webpage that includes unstructured data, in accordance with an embodiment of the present invention.

FIG. 2 is a depiction of an exemplary webpage, generally 200, in accordance with an embodiment of the present invention. Webpage 200, which includes an inventory of animals on an animal farm, includes unstructured data 210 and window 220. In response to a user of client 110 accessing webpage 200, which is included in data sources 130, program function 112 determines whether there are any charts available in data rendering database 122 that are associated with webpage 200. Program function 112 determines that there are four user-generated charts that are associated with webpage 200 and displays their name, rankings, and originating user in window 220.

In an embodiment, program function 112 uses object character recognition to determine whether webpage 200 includes numerical and/or quantitative wording or phrases, for example, "more than". If numerical and/or quantitative wording or phrases are present in webpage 200 and there are no associated charts available in data rendering database 122, program function 112 allows the user to generate a chart and stores the chart in data rendering database. Program function 112 associates each chart included in data rendering database 122 with the appropriate data source included data sources 130. In an embodiment, applicable data sources include webpages, emails, and/or text-based documents.

Figure 3:
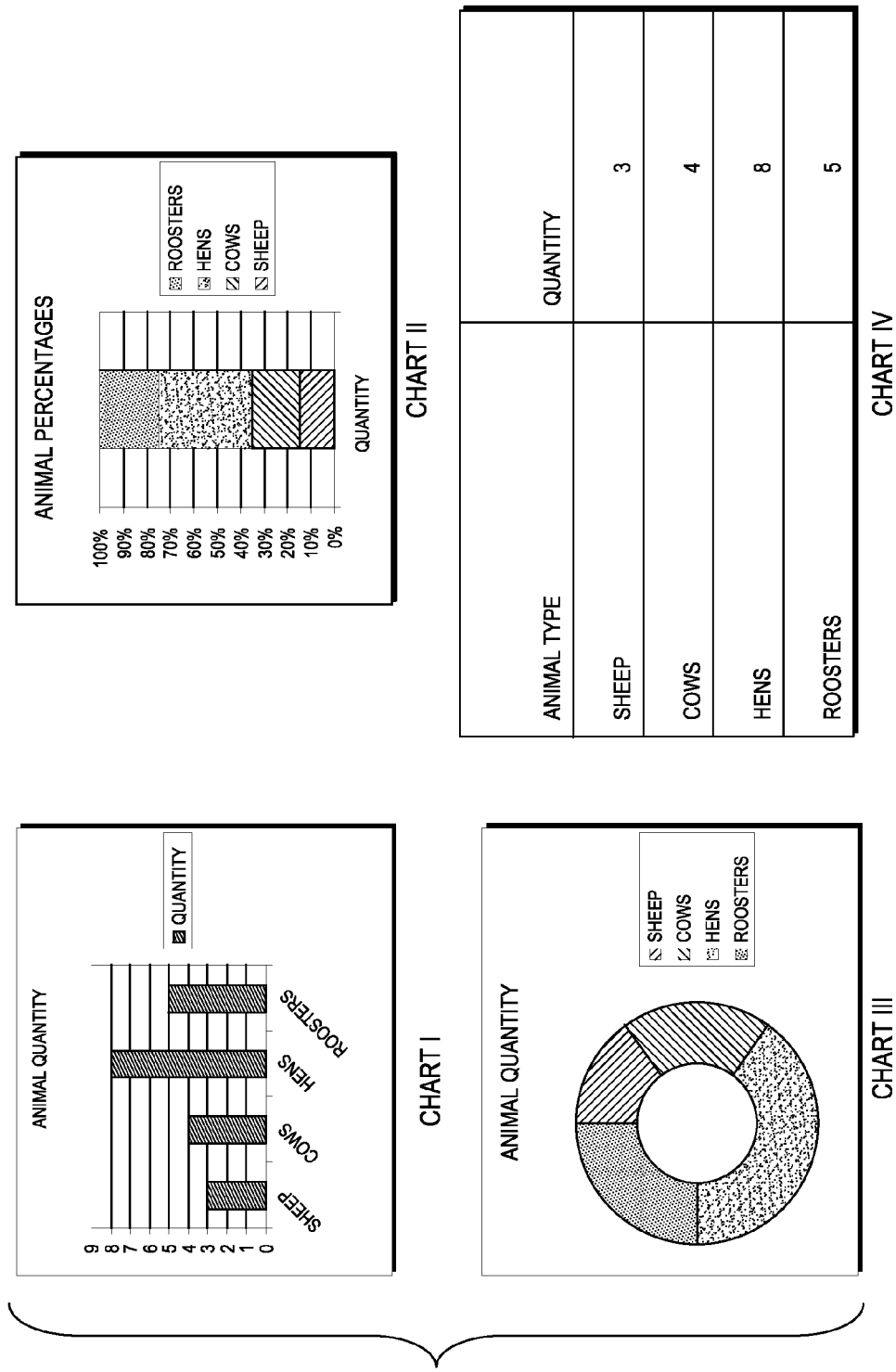
FIG. 3 depicts user-generated charts associated with the exemplary Webpage of FIG. 2, in accordance with an embodiment of the present invention.

Window 220 displays that there are four user-generated charts associated with unstructured data 210 Charts I, II, III, and IV that were generated by Users A, B, C, and D, respectively. FIG. 3 depicts Charts I, II, III, and IV, in accordance with an exemplary embodiment of the present invention. Specifically, FIG. 3 illustrates the animal inventory of webpage 200 depicted as a bar chart in Charts I and II, a pie chart in Chart III, and a table in Chart IV. If there are no user-generated charts available for webpage 200 in data rendering database 122, program function 112 allows the user of client 110 to generate and store one or more charts in data rendering database 122. Applicable charts include, but are not limited to, pie charts, line charts, bar charts, histograms, timelines, organizational charts, tree charts, flow charts, plots, area chart, cartogram, and pedigree charts.

Applicable charts also include, but are not limited to, bubble charts, polar area diagram, waterfall charts, radar charts, tree maps, mathematical diagrams, diagrams, and streamgraphs. Applicable charts may be two-dimensional or three-dimensional. If a user disagrees with a ranking depicted in window 220, then program function 112 allows the user to rank the chart. In an embodiment, program function 112 can display a chart's average ranking. In other embodiments, program function 112 can display rankings that are associated with one or more particular users, for example User A. Program function 112 can display all rankings that are associated with a particular chart or charts of a pre-determined minimum ranking. The user selects Chart IV and agrees with the ranking. In response to the user selecting Chart IV, program function 112 displays Chart IV.

Figure 4:
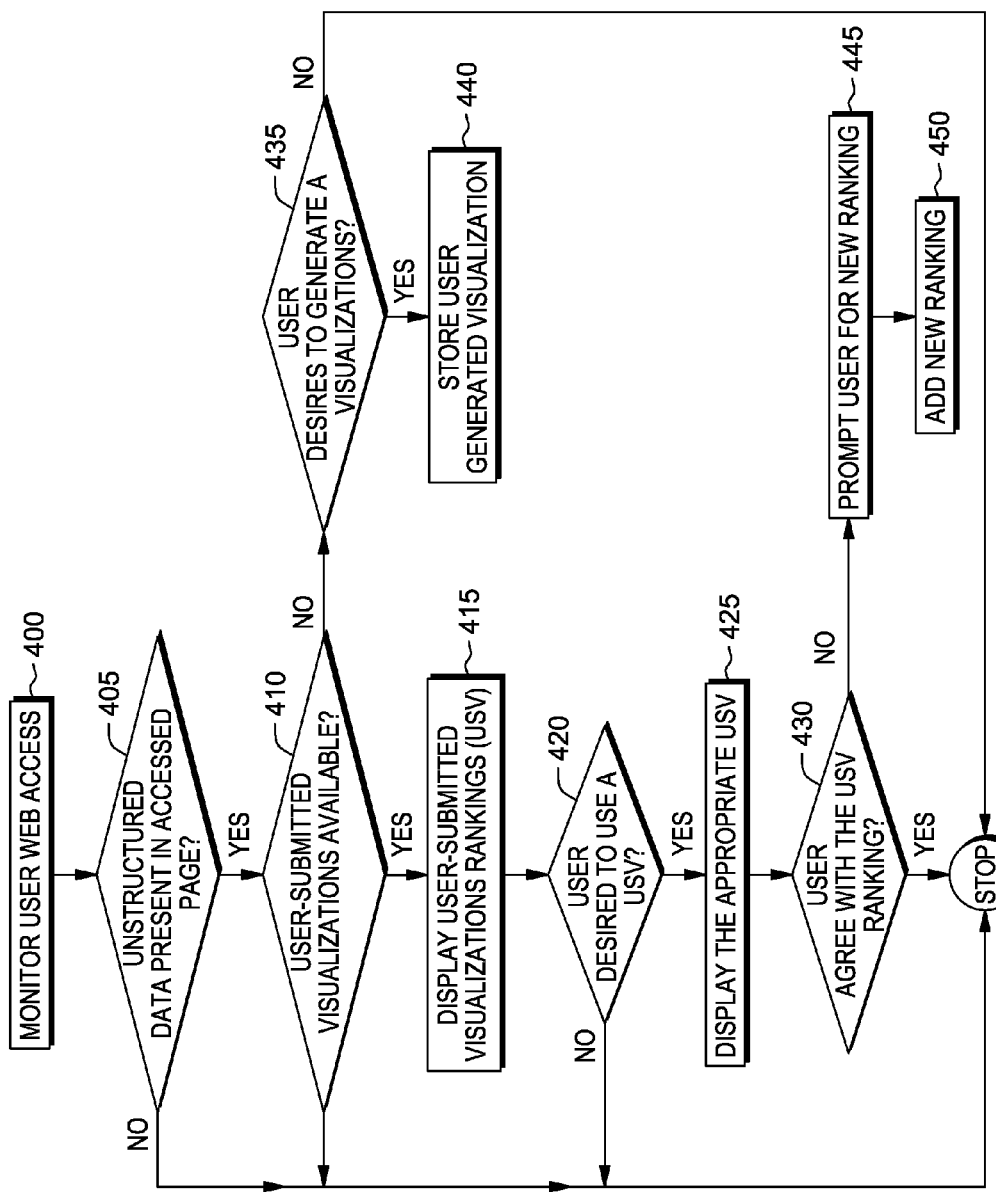
FIG. 4 illustrates operational steps of a program function, in accordance with an embodiment of the present invention.

FIG. 4 is a flowchart depicting operational steps of program function 112, in accordance with an embodiment of the present invention. Program function 112 monitors user webpage access (step 400). Program function 112 determines whether unstructured data is present in the accessed webpage (decisional 405). The purpose of this function is to find unstructured data. That means data that is not stored in an explicit relationship form. The function will scan each line into a list, and then find the lines that have a high frequency (duplication). Duplicated lines are removed as these are often taken to be footers and headers. If the page is an HTML page, the function will parse out all data in the <BODY> tag.

If decisional operation 405 determines that unstructured data is not present in the accessed page ("no" branch decisional 405), program function 112 stops. If unstructured data is present in the accessed page ("yes" branch decisional 405), program function 112 determines whether user-generated visualizations are available for the accessed page (decisional 410). User-generated visualizations are typically stored in some repository (for example a database keyed by the page name). In this embodiment, this repository takes the form of the relational database stored in the storage system shown in FIG. 1. This repository will be accessed, by using the key, to determine if a user-generated visualization is available. If user-generated visualizations are not available ("no" branch decisional 410), program function 112 determines whether the user desires to generate a chart (decisional 435).

If the user does not desire to generate a chart ('no" branch decisional 435), then program function 112 stops. If the user desires to generate a chart ("yes" branch decisional 435), program function 112 stores the user-generated chart (step 440). If user-generated charts are available ("yes" branch decisional 410), program function 112 displays the user-generated chart (UGC) rankings (step 415). Program function 112 determines whether the user desires to use a UGC (decisional 420). If the user does not desire to use a UGC ("no" branch decisional 420), program function 112 stops. If the user desires to use a UGC ("yes" branch decisional 420), program function 112 displays the appropriate UGC (step 425). To explain further, the "appropriate" UGC is the UGC (or UGCs) chosen by a user (often a human user), or by the controlling software, based on the rankings received from users (generally other human users). In this embodiment, the controlling software simply shows the highest ranked UGC as the "appropriate UGC." In other embodiments, the "appropriate UGC" may be selected in a different way (for example, showing the lowest ranked UGC, or showing all of the top three ranked UGCs). Program function 112 determines whether the user agrees with the UGC ranking (decisional 430). If the user does not agree with the UGC ranking ("no" branch decisional 430), program function 112 prompts user for a new ranking (step 445). Program function 112 stores the new ranking (step 450). If the user agrees with the UGS ranking ("yes" branch decisional 430), program function 112 stops. In an embodiment, program function 112 determines and displays the average ranking for a UGC using all user-generated rankings.

There are many possible embodiments for the form and format of the rankings. These embodiments include: (i) a simple binary (thumbs up/thumbs down); (ii) a scale (1-5); (iii) a scale (1-10) stars; (iv) weighted rankings (for example, highly active users supply rankings that are weighted to have greater influence on aggregate ranking than less active users); (v) multiple, role-based rankings (for example, separate rankings for people with different professions, such as scientists, engineers, accountants and artists); and/or (vi) qualitative rankings (for example, the use of user-selectable, non-numerical descriptors, such as, "detailed," "summary," "visually pleasing," "clever," "straight forward"). The user makes a selection, and the ranking is updated. With further regard to item (iv) in the foregoing list, some embodiments that include weighted rankings give new users (for example, users active less than one (1) year) a weight of 0.1 on ranking, while longer-term users receive a larger weight factor (for example, increasing linearly with time up to a maximum of 1.0 for users active over ten (10) years).

Figure 5:
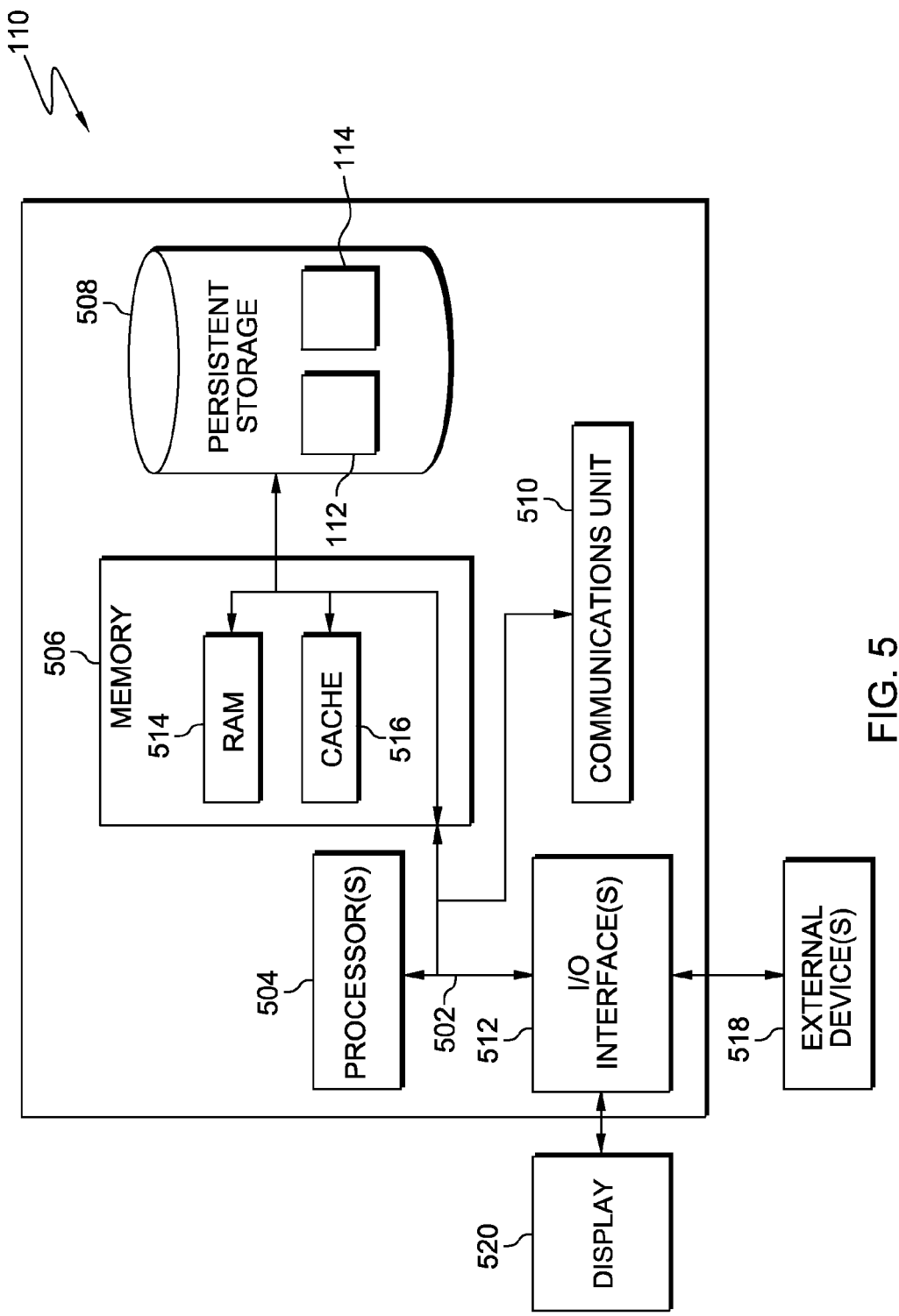
FIG. 5 depicts a block diagram of components of a client computing device executing the program function, in accordance with an embodiment of the present invention.

FIG. 5 depicts a block diagram of components of client 110, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Client 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or controlling information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer-readable storage media.

Program function 112 and data viewing software 114 are stored in persistent storage 508 for execution by one or more of the respective computer processor(s) 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of data sources 130, data rendering database 122, and rankings 124. In these examples, communications unit 510 includes one or more network interface cards. Communications unit 510 may provide communications through the use of either or both physical and wireless communications links. Program function 112 and data viewing software 114 may be downloaded to persistent storage 508 through communications unit 510.

I/O interface(s) 512 allows for input and output of data with other devices that may be connected to client 110. For example, I/O interface(s) 512 may provide a connection to external device(s) 518 such as a keyboard, a keypad, a touch screen, and/or some other suitable input device. External device(s) 518 can also include portable computer readable storage media such as, for example, thumb drives, portable optical or magnetic disks, and memory cards. Software and data used to practice embodiments of the present invention, e.g., program function 112, data rendering database 122, and rankings 124, can be stored on such portable computer readable storage media and can be loaded onto persistent storage 508 via I/O interface(s) 512. I/O interface(s) 512 also connects to a display 520. Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for creating and sharing crowd sourced graphical data visualization(s) for illustrating unstructured data sets to a user, the method comprising:

receiving, by one or more processors, one or more data subsets corresponding to at least a portion of machine readable, unstructured data in a first unstructured data set comprising a audio, video, and a webpage corresponding to a data viewing of a user wherein data viewing comprising of reading a webpage, watching a video and listening to an audio;

generating, by the one or more processors, a first data visualization corresponding to a first data subset of the one or more data subsets based on identifying at least one of numerical and quantitative wording comprising the first unstructured data set using object character recognition and user interactions, wherein the first data visualization is a graphical representation, created by the user, of the first data subset and comprises a chart, a graph, a diagram, a flow chart, a three dimensional representation, a color coded representation and a table for illustrating the first data subset to increase user comprehension of unstructured data associated with the first data subset corresponding to the data viewing of the user;

retrieving, by the one or more processors, a first one or more user rankings corresponding to one or more crowd sourced data visualizations, wherein the one or more crowd sourced data visualizations are graphical representations associated with the one or more data subsets and comprise at least one of charts, graphs, diagrams, flow charts, three dimensional representations, color coded representations and tables for illustrating the one or more data subsets to increase user comprehension of unstructured data associated with the one or more data subsets corresponding to the data viewing of the user;

generating, by the one or more processors, average user rankings corresponding to the one or more crowd sourced data visualizations based on the retrieved first one or more user rankings;

receiving, by the one or more processors, a second one or more user rankings generated by the user that evaluate the one or more crowd sourced data visualizations associated with the one or more data subsets;

displaying, by the one or more processors, at least one of the average user rankings and the first one or more rankings corresponding to the one or more crowd sourced data visualizations; and displaying, by the one or more processors, at least one of the one or more crowd sourced data visualizations responsive to a user selection to view the at least one crowd sourced data visualizations.

2. A computer program product for creating and sharing crowd sourced graphical data visualizations for illustrating unstructured data sets to a user, the computer program product comprising:

one or more computer readable tangible storage media and program instructions stored on the one or more computer readable tangible storage media, the program instructions executable by one or more processors to:

receive one or more data subsets corresponding to at least a portion of machine readable, unstructured data in a first unstructured data set comprising a audio, video, and a webpage corresponding to a data viewing of a user wherein data viewing comprising reading a webpage, watching a video and listening to an audio;

generate a first data visualization corresponding to a first data subset of the one or more data subsets based on identifying at least one of numerical and quantitative wording comprising the first unstructured data set using object character recognition and user interactions, wherein the first data visualization is a graphical representation, created by the user, of the first data subset and comprises at least one of a chart, a graph, a diagram, a flow chart, a three dimensional representation, a color coded representation and a table for illustrating the first data subset to increase user comprehension of unstructured data associated with the first data subset corresponding to the data viewing of the user;

retrieve first one or more user rankings corresponding to one or more crowd sourced data visualizations, wherein the one or more crowd sourced data visualizations are graphical representations associated with the one or more data subsets and comprise at least one of charts, graphs, diagrams, flow charts, three dimensional representations, color coded representations and tables for illustrating the one or more data subsets to increase user comprehension of unstructured data associated with the one or more data subsets corresponding to the data viewing of the user;

generate average user rankings corresponding to the one or more crowd sourced data visualizations based on the retrieved first one or more user rankings;

receive a second one or more user rankings generated by the user that evaluate the one or more crowd sourced data visualizations associated with the one or more data subsets;

display at least one of the average user rankings and the first one or more rankings corresponding to the one or more crowd sourced data visualizations; and display at least one of the one or more crowd sourced data visualizations responsive to a user selection to view the at least one crowd sourced data visualizations.

3. A computer system for creating and sharing crowd sourced graphical data visualizations for illustrating unstructured data sets to a user, the computer system comprising:

one or more computer processors;
one or more computer readable tangible storage media;
program instructions stored on the one or more computer readable tangible storage media for execution by at least one of the one or more computer processors, the program instructions comprising program instructions to:

receive one or more data subsets corresponding to at least a portion of machine readable, unstructured data in a first unstructured data set comprising a text document, audio, video, and a webpage corresponding to a data viewing of a user wherein data viewing comprising reading a webpage, watching a video and listening to an audio;

generate a first data visualization corresponding to a first data subset of the one or more data subsets based on identifying at least one of numerical and quantitative wording comprising the first unstructured data set using object character recognition and user interactions, wherein the first data visualization is a graphical representation, created by the user, of the first data subset and comprises at least one of a chart, a graph, a diagram, a flow chart, a three dimensional representation, a color coded representation and a table for illustrating the first data subset to increase user comprehension of unstructured data associated with the first data subset corresponding to the data viewing of the user;

retrieve first one or more user rankings corresponding to one or more crowd sourced data visualizations, wherein the one or more crowd sourced data visualizations are graphical representations associated with the one or more data subsets and comprise at least one of charts, graphs, diagrams, flow charts, three dimensional representations, color coded representations and tables for illustrating the one or more data subsets to increase user comprehension of unstructured data associated with the one or more data subsets corresponding to the data viewing of the user;

generate average user rankings corresponding to the one or more crowd sourced data visualizations based on the retrieved first one or more user rankings;

receive a second one or more user rankings generated by the user that evaluate the one or more crowd sourced data visualizations associated with the one or more data subsets;

display at least one of the average user rankings and the first one or more rankings corresponding to the one or more crowd sourced data visualizations; and display at least one of the one or more crowd sourced data visualizations responsive to a user selection to view the at least one crowd sourced data visualizations.

4. The method of claim 1, wherein the first one or more user rankings and the one or more crowd sourced data visualizations are stored in a cloud-implemented data repository.

5. The method of claim 1, further comprising:
generating, by the one or more processors, a user interface allowing the user to choose to have displayed a subset of the one or more crowd sourced data visualizations, wherein the subset is chosen in a way that is based, at least in part, on the first one or more user rankings.

6. The method of claim 4, further comprising:
storing the first data visualization and the second one or more user rankings in the cloud-implemented data repository for sharing with other users.

7. The method of claim 6, wherein the cloud-implemented data repository is publicly accessible and the first and second one or more user rankings are generated by members of the general public.

8. The method of claim 6, further comprising:
accessing the cloud-implemented data repository for retrieving the first one or more user rankings and the one or more crowd sourced data visualizations for displaying to the user.

9. The computer program product of claim 2, wherein the first one or more user rankings and the one or more crowd sourced data visualizations are stored in a cloud-implemented data repository.

10. The computer program product of claim 2, further comprising:
program instructions to generate a user interface allowing the user to choose to have displayed a subset of the one or more crowd sourced data visualizations, wherein the subset is chosen in a way that is based, at least in part, on the first one or more user rankings.

11. The computer program product of claim 9, further comprising:
program instructions to store the first data visualization and the second one or more user rankings in the cloud-implemented data repository for sharing with other users.

12. The computer program product of claim 11, wherein the cloud-implemented data repository is publicly accessible and the first and second one or more user rankings are generated by members of the general public.

13. The computer program product of claim 11, further comprising:
program instructions to access the cloud-implemented data repository for retrieving the first one or more user rankings and the one or more crowd sourced data visualizations for displaying to the user.

14. The computer system of claim 3, wherein the first one or more user rankings and the one or more crowd sourced data visualizations are stored in a cloud-implemented data repository.

15. The computer system of claim 3, further comprising:
program instructions to generate a user interface allowing the user to choose to have displayed a subset of the one or more crowd sourced data visualizations, wherein the subset is chosen in a way that is based, at least in part, on the first one or more user rankings.

16. The computer system of claim 14, further comprising:
program instructions to store the first data visualization and the second one or more user rankings in the cloud-implemented data repository for sharing with other users.

17. The computer system of claim 16, wherein the cloud-implemented data repository is publicly accessible and the first and second one or more user rankings are generated by members of the general public.

18. The computer system of claim 16, further comprising:
program instructions to access the cloud-implemented data repository for retrieving the first one or more user rankings and the one or more crowd sourced data visualizations for displaying to the user.

* * * * *